3,254,979
METHOD FOR FORMING BALLS FROM
THERMOPLASTIC MATERIALS
Warren R. Knapp, Addison, and Elmer R. Smith, Savona,
N.Y., assignors to Corning Glass Works, Corning,
N.Y., a corporation of New York
Filed Aug. 1, 1962, Ser. No. 214,067
3 Claims. (Cl. 65—21)

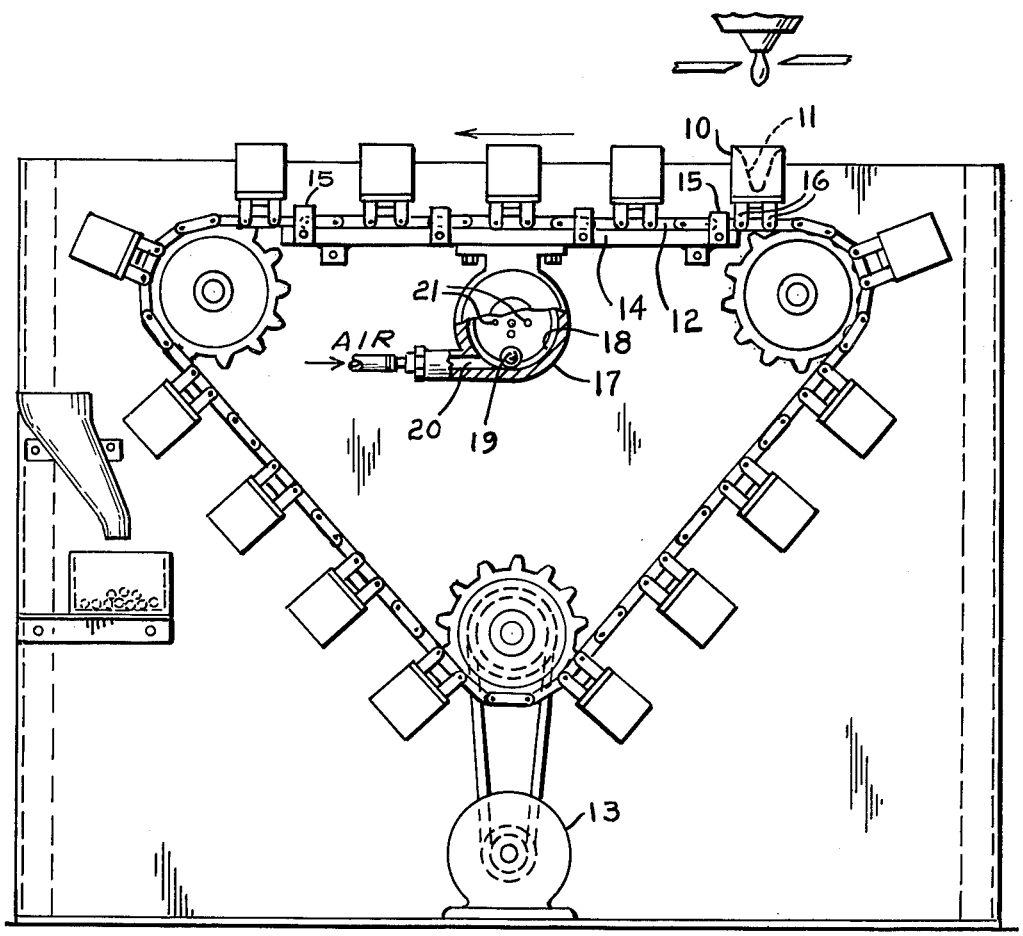

This invention relates to methods and apparatus for forming solid spherical and ovoid balls from thermoplastic materials.

Among the advantages of the invention are the following:

Balls of varying sizes can be made by the same method and with the same apparatus employing identical molds, the only variation in the manufacture being in the amount of thermoplastic material fed into the molds.

It is possible to make balls of sizes smaller than those obtainable by conventional methods.

Glass balls can be made according to the invention which are completely free from shear marks, even without fire polishing.

These and other advantages, which will be apparent from the description, accrue from the use of upwardly concave open molds which are vibrated to form gobs of thermoplastic material into smooth balls.

The invention will be described with reference to the accompanying drawing, which is a side elevational view of a preferred machine for manufacturing glass balls according to the invention.

The molds utilized in forming glass balls according to the invention have upwardly concave inner surfaces, represented by the broken line 11 of mold 10 of the drawing. The molds may be made of any conventional material, for example, graphite. Inner surface 11 need have no particular configuration; the only requirements are that it be a smooth surface where it contacts the glass and that the cavity be such as to permit the glass to move about freely as it vibrates. It will be found advantageous to provide a mold having a deep cavity to prevent the ball from vibrating out of the mold. By way of example, a mold may be constructed having an inner surface in the form of a surface of revolution having cross-sections through its axis in the form illustrated by broken line 11. Such sections have depths of approximately 1¼ inches, and taper gradually from a maximum width of 1½ inches near the orifice. The curvatures of these sections vary from a radius of about 3 inches near the top of the mold to a radius of about ¼ inch at the bottom. Molds having this configuration can be used for making glass balls having diameters varying between ⅛ inch and ⅝ inch. For larger balls, larger molds of similar shape will be used.

Mold 10 is rigidly attached by means of supports 16 to one link of chain 12, which is caused to move continuously by means of motor 13. Chain 12 passes along the top of metal plate 14 and is held tightly against the plate by means of L-shaped brackets such as 15. Brackets 15 are provided at each side of chain 12, and do not extend across the full width of the chain, thus permitting supports 16 to pass therebetween. In this way chain 12 is held firmly against plate 14 as it passes over the top surface of the plate and consequently vibrates with plate 14.

In the illustrated embodiment, plate 14 and chain 12 are caused to vibrate by means of a vibrator which is designed to provide vibrations in a plurality of directions substantially throughout 360° in one plane. Such vibrator may be, for example, vibrator 17, which comprises a closed cylinder having its inner wall provided with a circular track 18 extending around the inner surface of the cylinder along which steel ball 19 is propelled at high speeds by the passage of compressed air through inlet 20, tangential to track 18, such air being exhausted through apertures 21 at one base of the cylinder. As steel ball 19 travels along track 18, the vibrator is subjected to a large number of vibrations, for example, approximately 7,000 vibrations per minute emanating radially outward from the center of the cylinder. These vibrations are transmitted to plate 14, chain 12 and the molds, all of which are in essentially inelastic contact. These vibrations cause the glass gobs in the molds to vibrate and continuously to rotate. The interaction between the rotating gobs and the walls of the molds as the glass cools causes the gobs to be malleated into spheres of great dimensional precision.

It is not necessary that the molds be oriented with their axes vertical, nor is it necessary that the molds have cavities in the form of surfaces of revolution. The molds of the drawing may be tilted in any direction as long as the degree of tilt is not so great as to permit the glass to vibrate out of the molds.

When the vibrator and the molds are oriented so that the mold axes are vertical and vibrations are in a plane generally parallel to the axes of the molds, spherical balls are produced. Neither said axes nor said plane need be vertical, and when the axes of the molds are not parallel to the plane of vibration, smooth, ovoid balls are formed. Ovoid balls of high eccentricity are formed when the vibrator of the illustrated machine is positioned to produce vibrations in a horizontal plane. For some applications, it may be advantageous to employ more than one vibrator along the chain, and in such cases the speeds of vibrations may be greater at that part of the chain near the source of glass, since the glass is less likely to vibrate out of the molds when it is soft than after it has begun to harden.

It will be apparent from the description that the present invention does not produce glass balls by causing a charge of glass to conform to the shape of the mold in which the glass is worked. Rather the mold is employed merely to support the charge and to transmit vibrations thereto and to cause the charge to rotate randomly in all directions such that the surface of the mold comes into contact successively with a very large number of small areas around the surface of the charge. Thus, the charge is formed into a smooth ball not by molding but by a process of malleation, wherein the mold surface eliminates irregularities in the surface of the glass. Consequently, vibrators other than the type utilized in the illustrated embodiment may be employed to form glass balls according to the invention. Any vibrator which will effect multi-directional rotation of the glass charge in the mold may be employed. For example, a conventional reciprocating vibrator which produces vibrations in each direction along a straight line may be used. In this case glass balls will be formed only if the vibration has a substantial vertical component.

It will be understood that the illustrated machine is constructed with a plurality of molds carried on a chain for purposes of speed of production. It will be apparent that glass balls may be made in a single mold having a vibrator attached directly thereto.

Neither glass composition nor viscosity is critical in the present process. It will be obvious that the only requirements in this regard are that the viscosity of the glass charge which is fed into the mold be sufficiently low to permit the vibrating mold surface to malleate the charge and that the vibrations continue until the glass has cooled sufficiently to prevent its deformation by sagging or otherwise after removal from the mold. If desired, the molds may be provided with cooling means to hasten the cooling of the glass.

Although the invention has been described with reference to its utility in the manufacture of glass balls, it is to be understood that the method and apparatus of the invention may be used in forming balls from all thermoplastic materials. Other such materials are, for example, molten metals and plastics.

It will be apparent from the foregoing description that variations may be made in the process of the invention and in the construction of the apparatus utilized for supporting a charge of thermoplastic material and malleating it into the form of a ball. Accordingly, it is intended that the present invention be limited only by the scope of the appended claims.

What is claimed is:

1. The method for forming a ball from a thermoplastic material which comprises the steps of depositing a charge of molten thermoplastic material in a mold having an upwardly concave cup-shaped forming surface and vibrating said surface in at least one direction having a component perpendicular to the surface of said charge at the location of contact between said forming surface and said charge and at the time of said contact, in order to form said charge into a ball through malleation.

2. The method of forming a glass ball which comprises the steps of supporting a charge of molten glass in a mold having an upwardly concave cup-shaped forming surface and subjecting said surface to motion relative to said charge, said motion relative to said charge being substantially solely vibratory in at least one direction having a component perpendicular to the surface of said charge at the location of contact between said forming surface and said charge and at the time of said contact, and thereby forming said charge into a ball substantially solely through malleation effected by said vibratory motion.

3. The method of forming a substantially spherical ball from a thermoplastic material which comprises the steps of depositing a charge of molten thermoplastic material in a mold having an upwardly concave cup-shaped forming surface and vibrating said forming surface relative to said charge in a plurality of directions throughout 360° in a substantially vertical plane to malleate said charge into a substantially spherical ball.

References Cited by the Examiner

UNITED STATES PATENTS

| | | | |
|---|---|---|---|
| 754,165 | 3/1904 | Ripley | 65—21 |
| 1,340,690 | 5/1920 | Waechter. | |
| 2,320,341 | 6/1943 | Bowes | 65—35 X |
| 2,329,146 | 9/1943 | Teichmann | 65—302 X |
| 2,332,361 | 10/1943 | Anastor et al. | 65—142 X |
| 2,335,294 | 11/1943 | Meyer | 65—21 X |
| 2,911,669 | 11/1959 | Beckwith | 65—21 X |
| 3,075,371 | 1/1963 | Cooke et al. | 65—35 |

DONALL H. SYLVESTER, *Primary Examiner.*

FRANK W. MIGA, *Assistant Examiner.*